United States Patent [19]

Decker, Jr. et al.

[11] 4,130,615
[45] Dec. 19, 1978

[54] METHOD FOR MAKING AN INSULATED CONTAINER HAVING A SHOCK-RESISTANT BOTTOM

[75] Inventors: Joseph A. Decker, Jr.; Bipinchandra Amin; William R. Magruder, all of Houston, Tex.

[73] Assignee: Igloo Corporation, Houston, Tex.

[21] Appl. No.: 895,894

[22] Filed: Apr. 13, 1978

[51] Int. Cl.² .................. B29D 27/04; B29G 7/02; B29D 9/00; B29D 9/10
[52] U.S. Cl. .................. 264/46.5; 264/46.6; 264/46.8; 264/130; 264/261; 264/264
[58] Field of Search ............ 206/521, 523, 587, 592, 206/594; 220/444; 264/46.4, 46.5, 46.8, 261, 264, 259, 46.6; 62/DIG. 13, 371, 457, 459, 466, 465

[56] References Cited

U.S. PATENT DOCUMENTS

| | | | |
|---|---|---|---|
| 3,132,382 | 5/1964 | Magester | 264/46.6 |
| 3,161,436 | 12/1964 | Hood | 264/46.6 |
| 3,163,686 | 12/1964 | Dusel et al. | 264/46.6 |
| 3,455,483 | 7/1969 | Inklaar | 220/444 |
| 3,950,462 | 4/1976 | Schaffer et al. | 264/46.8 |

Primary Examiner—W.E. Hoag
Attorney, Agent, or Firm—Fulbright & Jaworski

[57] ABSTRACT

A plastic-like container liner having spaced apart ridges at the bottom of said liner has a non-adhering material positioned on the upper inner surface of each ridge. A lower container body is positioned into a female foaming fixture and an expanding exothermic foam is injected onto the inside bottom surface of the lower container body. A male foaming fixture having spaced apart recesses conforming to the ridges of the liner intimately receives the liner and urges the peripheral flat portion of the liner toward the bottom surface of the lower container body. The foam expands exothermally such that heat released by the foam causes the non-adhering material to flow. The expanding foam is bonded to the lower container body and to the portion of the liner not in contact with the non-adhering material. Resultingly, an integral insulated container is formed having projecting ridges on the bottom surface thereof which assist in resisting the shock of items dropped into the container.

7 Claims, 3 Drawing Figures

U.S. Patent  Dec. 19, 1978  4,130,615
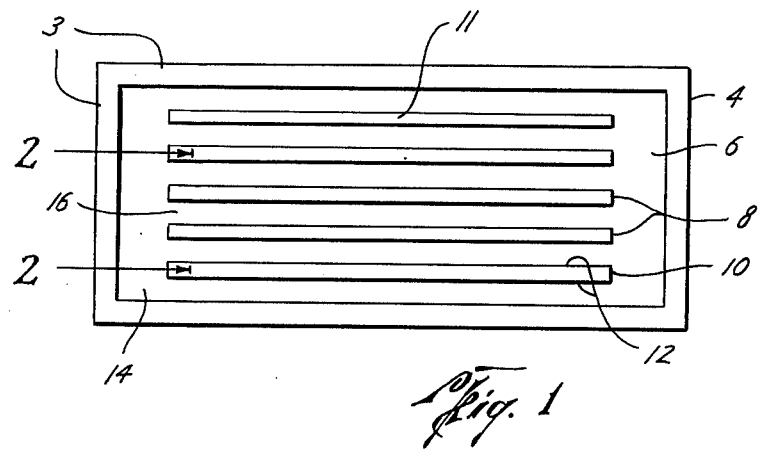
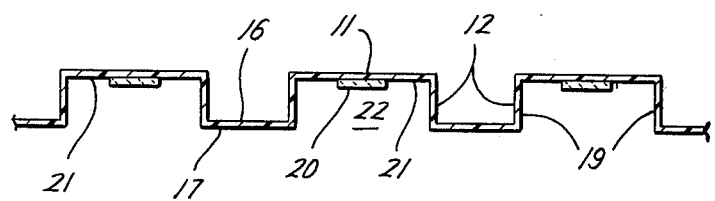
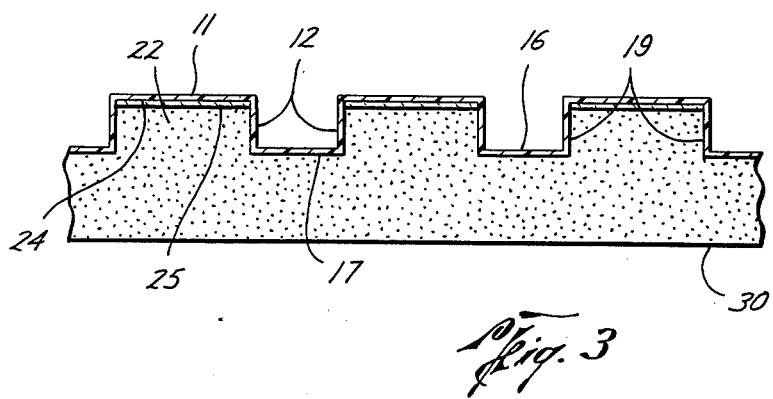

METHOD FOR MAKING AN INSULATED CONTAINER HAVING A SHOCK-RESISTANT BOTTOM

STATEMENT OF THE PRIOR ART

Thermal containers, in particular those portable ice chests having a plastic liner, are suitable thermal barriers for maintaining ice and other contents therein at low temperatures for long periods of time. The plastic liners inside the containers, however, are generally flat and secured to a container body which serves as a load-bearing and protective member. The inner linings of the containers are therefore rigidly held by the outer container, not providing for any resilience of the liner, and the liner is therefore highly susceptible to fracture caused by falling objects such as soft drink cans, chunks of ice and the like. Furthermore, a plastic-like liner, such as made from ABS, or other plastic-like material often does not adhere closely to the supporting surface throughout all points of contact, thereby producing "blisters." Blisters are areas in which spaces occur between the supporting container and the liner, which, upon impact of the liner by an object, causes the liner to fracture.

Methods for attempting to manufacture a more shock-resistant container liner have often involved the placing of a fiberboard between the outer container and the liner of an ice chest. Although impact resistance is increased by the use of the fiberboard, the liner is no longer efficiently, economically and directly bonded to the outer container. Such a device is disclosed in U.S. Pat. No. 3,389,824 to Berchtold of June, 25, 1968.

A review of other prior art discloses a method in U.S. Pat. No. 3,723,585 to Nussbaum of Mar. 27, 1973, involving a method of electroforming molds. In the Nussbaum method, a wax is used to form hollow ridges after the article is subjected to heat.

U.S. Pat. No. 3,496,265 to Anglada, et al, of Feb. 17, 1970, discloses the use of a release agent to prevent adherence or absorption of a dispersing agent.

SUMMARY OF THE PRESENT INVENTION

The present invention is a method for manufacturing an integral lower container body having a liner therein, the bottom of which liner possesses significantly higher impact resistance than the liners of commercial containers. A plastic-like material, preferably acrylonitrile-butadiene-styrene (ABS), is supported at the edges, heated, and blown into a bubble-like appearance, and a male mold is then brought into contact with the ABS sheet, urging the sheet into a conforming female vacuum mold having a plurality of spaced apart ridges projecting from the face of the female mold. Upon cooling of the ABS sheet, a container liner results having a series of spaced apart ridges projecting upwardly from the inside floor of the liner, the ridges not extending to the sides of the liner but rather terminating in a flat surface around the periphery of the floor of the liner.

The formed liner is thereafter inverted, placed on a conveyor device, at which time a wax-like material is roller applied onto the inside top surface of the ridges, which because of their inverted position appear as the bottoms of grooves. The wax-like material then dries and is ready for foaming.

A lower container body is placed into a female foaming fixture. A two or three part expanding, exothermic urethane foam is injected into the bottom surface of the container body. The liner is inserted upright into the container body. A male foaming fixture, having a plurality of recesses suitable for receiving the plurality of ridges of the liner, contacts the unridged portion of the liner floor and urges the liner floor toward the container body and urethane foam.

The heat released by the expanding foam causes the dried wax to flow. The expanding foam further urges the flowing wax toward the top inside surface or the ridges and to cover effectively those surfaces. Consequently, the expanded foam is bonded to the lower container body, and the underside surface of the liner except for the uppermost inside surface which is covered by the wax. The resulting lined container therefore has a liner bonded directly to the container body, and the liner floor has a plurality of ridges projecting upwardly, the uppermost portions of the ridges being unbonded and therefore highly impact resistant.

It is therefore an object of the present invention to provide a method for manufacturing a thermal container with enhanced impact characteristics of the liner floor.

It is a further object of the present invention to provide an economic method for manufacturing an impact resistant container floor.

An even further object of the present invention is to provide a method for manufacturing a thermal container having an impact resistant liner floor such that blistering, indentations and other undesirable irregularities on the liner floor are minimized or eliminated.

Yet another object of the present invention is to provide a method of manufacture of a thermal container with an impact resistant liner floor such that the liner for the lower container body and the liner for the lid may be of one material.

These and other objects and advantageous of the present invention will be apparent when read in the light of the specification, drawings and claims appended hereto.

BRIEF DESCRIPTION OF THE DRAWINGS

FIG. 1 is a top plan view of the container showing the container walls, the inside liner of the container and the elevated ridges on the liner.

FIG. 2 is a partial view in section taken along lines 2—2 showing the ridged liner and wax-like substance rolled onto the inside surface of the ridge prior to the foaming operation.

FIG. 3 is a partial view in section taken along lines 2—2 after the foaming operation, showing the dispersion of the wax-like substance along the inside top surface of the liner and the bonding of the foam to the liner and the container body.

DESCRIPTION OF THE PREFERRED EMBODIMENT

The method involved in the present invention involves primarily three fundamental operations: vacuum forming; application of a wax-like material; and a foaming operation.

In the vacuum forming operation, a thin sheet of a plastic-like material generally conforming to the desired shape of the container liner is supported at the edges, heated and then blown into a bubble-like appearance. A vacuum mold conforming to the surfaces 11, 12 and 16 of FIG. 2 is applied directly onto the bubble. A plurality of holes within the vacuum mold (not shown) transmits a vacuum effect to the plastic-like material thereby drawing the material into close conformity to the shape of the mold. Cooling the plastic-like material produces a thin container liner similar to that as shown in FIG. 1 excepting the container body walls 3 which are not yet brought into contact with the liner.

As the palstic-like material is removed from the vacuum mold, the liner retains its vacuum formed shape which consists primarily of a flat outer perimeter 6, a plurality of spaced part ridges 8 having the side walls 12 and the top surface 11 and a groove surface 16 defining the separation between the ridges 8.

In the second operation, the formed container liner is inverted and is preferably placed on a conveyor belt such that the groove surfaces 16 are higher than the top surfaces 11. As the inverted liner progresses along the conveyor belt (not shown), a quantity of a wax-like material 20 is applied to each of the inside top surfaces 21 substantially along the entire length of the ridges 8.

During the third operation, the container body whose walls 3 are shown in FIG. 1 is placed into a female foaming fixture (not shown) in an upright position such that the container walls 3 are substantially vertical and define an aperture leading to the container floor 30 as shown in FIG. 3. The liner is reinverted to its original position wherein the top surfaces 11 are higher relative to the groove surfaces 16. A two or three part expanding, exothermic urethane foam is disposed onto the container floor 30. The liner in its present position is placed inside the container body and is then brought into contact with the foam disposed on the container floor 30. A male foaming fixture (not shown) having surfaces conforming to the top surfaces 11, the sidewalls 12 and the groove surfaces 16 is brought into conforming contact with the liner thereby urging the liner into intimate contact with the foam. The foam produces an expanding, exothermic reaction. The heat given off by the exothermic reaction of the urethane foam causes the wax-like material 20 to flow as the expanding foam urges the flowing wax-like substance into contact with the inside top surface 24 of the top surface 11. When the foaming reaction is complete, a set foam 22 results with the set foam 22 bonded to the container floor 30 and bonded to the inside groove surface 17 and inside wall surfaces 19.

The exothermic reaction ideally causes the wax-like material 20 of FIG. 2 to flow along the entire inside top surface 24 of each ridge 8 whereby the final wax configuration 25 as shown in FIG. 3 is disposed between the set foam 22 and the inside top surface 24. Accordingly, the thin ridged liner is suitably supported by the container floor 30 inasmuch as the groove surfaces 16 and a portion of the side walls 12 are chemically bonded to the set foam 22 which in turn is chemically bonded to the container floor 30. The final wax configuration 25 prevents the chemical bonding of the set foam 22 to the portions of the liner covered by the final wax configuration 25. Accordingly, the inside top surfaces 24 are not bonded to the set foam 22 and are displaced from the set foam 22 by the final wax configuration 25. The result is therefore that the top surfaces 11 are more impact resistant than the surfaces bonded to the set foam 22. Those skilled in the art will realize that a portion of the inside wall surfaces 19 may also be in contact with the final wax configuration 25 if the flow of the wax traverses the entire inside top surface or surfaces 24 of the top surfaces 11.

The advantages of this new method of making an insulated container having a shock-resistant bottom are numerous. By way of example and not by way of limitation, the ridge bottom liner reduces the number of marks, indentations and "blisters" which are frequently the result of a flat container liner. Moreover, the manufacturer can utilize a material for the liner which is economical, impact resistant and cosmetically acceptable to the user. Furthermore, the heat requirement during the vacuum forming operation is reduced inasmuch as the exothermic reaction itself tends to cause the wax-like material to flow, and it is not necessary to impart sufficient heat to the formed liner to melt the wax-like material. Those skilled in the art will realize that processing at the vacuum forming stage is therefore accelerated.

A preferred method for making an insulated container having a shock-resistant bottom provides for the vacuum forming of a thin sheet of acrylonitrile-butadiene-styrene (ABS) into a container liner having spaced apart ridges 8 extending substantially the length of the liner and terminating in a flat outer perimeter 6. The ridges 8 each comprise a top surface 11 and a pair of integrally connected sidewalls 12, and a groove surface 16, being a continuation of and substantially at right angles to the sidewalls 12, separates each pair of ridges 8. Cooling of the vacuum formed liner and removal of the vacuum mold (not shown) allows the formed liner to be inverted at which time a thin layer of Brulin 256 wax approximately ¼ inch wide is roller applied onto the inside top surface 21 of the liner. The wax 20 is preferably applied to the vacuum-formed liner while the liner is progressing on a conveyor belt or other similar apparatus to the foaming operation, thus reducing the production time requirements. A two or three part urethane expanding, urethane foam is applied to the container bottom 30. The vacuum formed liner is reinverted to its original position and urged towards the container floor and urethane foam by means of a foaming fixture which closely conforms to the top surfaces 11, sidewalls 12 and groove surfaces 16 of the vacuumed formed liner. Preferably, the foaming fixture is also in intimate contact with substantially all the outer perimeter 6 of the vacuum formed liner in order to reduce or eliminate blistering during the foaming operation. Blistering is a term which describes an air space existing between the vacuum formed liner and the container floor 30. Blistering produces harmful side effects including but not limited to reduced bonding between the vacuum formed liner and the set foam 22 and also reduces the structural support by the set foam 22 of the vacuum formed liner thereby rendering the liner susceptible to chipping and cracking when a load is applied to the blistered area. Continuous pressure by the foaming fixture on the flat outer perimeter 6 of the liner urges all portions of the outer perimeter 6 toward the container floor 30 and hence into intimate contact with the urethane foam whereby blistering is reduced as the set foam 22 adheres to the vacuum formed liner.

According to the preferred embodiment, the method described and claimed herein provides for an economical, accelerated method of manufacturing a container having a load supporting container body with an attractive inside liner which can withstand impact caused by the dropping of soda pop cans, chunks of ice and the like. Although for purposes of full disclosure and explanation a preferred embodiment has been described, it is understood that several combinations of equivalent structure and several equivalent steps for arranging the structure fall both within the scope and the spirit of the invention as described herein and claimed hereafter.

What is claimed is:

1. A method for making an insulated container having a shock-resistant bottom comprising the steps of:
   (a) supporting a pliable sheet of a heated plastic-like material near the edges of said material;
   (b) forming a liner having a plurality of substantially aligned ridges of the material of step (a), each of said ridges having a top with two sides joining the top with a floor of the plastic-like material, by contacting the material of step (a) with a mold having a plurality of substantially aligned ridges thereon;
   (c) cooling the liner of step (b);
   (d) applying a quantity of a non-adhering material to the top inside surface of the ridges of step (c);
   (e) substantially drying the non-adhering material;
   (f) forming a lower container body having a bottom, four sides and an open top;
   (g) positioning the lower container body of step (f) in a female fixture whereby the open top of the lower container body is substantially unobstructed;
   (h) applying a multiple component, expanding exothermic foam onto the inside bottom surface of the container body of step (g);
   (i) positioning the ridged liner of step (e) inside the lower container body of step (h) such that the non-adhering material of step (e) is disposed between the expanding foam of step (h) and top inside surface of the ridges; and
   (j) expanding the foam of step (h) such that the expanding exothermic foam heats the non-adhering material and urges and non-adhering material toward the top inside surface of the ridges such that the foam adheres to the floor and the sides of the ridges not in contact with the non-adhering material and to the lower container body thereby producing an insulated container having a bonded inside liner, the bottom of said liner having ridges therealong, the tops of which are reasonably shock-resistant.

2. The method of claim 1 wherein the plastic-like material is acrylonitrile-butadiene-styrene.

3. The method of claim 1 wherein the mold of step (b) is a perforated female vacuum mold.

4. The method of claim 1 wherein the non-adhering material of step (d) is a wax.

5. The method of claim 1 wherein the non-adhering material of step (d) is roller-applied.

6. The method of claim 1 wherein the foam of step (h) is a urethane foam.

7. The method of claim 1 wherein a male fixture having recesses therein of sufficient dimension to receive intimately the ridges of the liner contacts and urges the floor of the liner of step (j) into intimate contact with the expanding foam thereby improving the bonding of the foam to the liner floor.

* * * * *